United States Patent [19]

Farnham et al.

[11] Patent Number: 4,598,161

[45] Date of Patent: Jul. 1, 1986

[54] TRIS(DIALKYLAMINO)SULFONIUM BIFLUORIDE CATALYSTS

[75] Inventors: William B. Farnham, Wilmington, Del.; William J. Middleton, Chadds Ford, Pa.; Dotsevi Y. Sogah, Wilmington, Del.

[73] Assignee: E. I. Du Pont de Nemours and Company, Wilmington, Del.

[21] Appl. No.: 481,927

[22] Filed: Apr. 4, 1983

[51] Int. Cl.$^4$ .................... C07C 87/04; C07C 149/00; C07C 149/46
[52] U.S. Cl. .................................. 564/101; 546/246; 546/186; 546/208; 548/523; 548/542
[58] Field of Search ................ 564/101; 548/523, 542; 546/246, 186, 208

[56] References Cited

U.S. PATENT DOCUMENTS

| | | | |
|---|---|---|---|
| 3,121,112 | 2/1964 | Tullock | 564/101 X |
| 3,577,459 | 5/1971 | Laughlin | 564/101 |
| 3,636,103 | 1/1972 | Gosselink | 564/101 X |
| 3,940,402 | 2/1976 | Middleton | 564/101 UX |
| 4,417,034 | 11/1983 | Webster | 526/190 |

Primary Examiner—Paul F. Shaver

[57] ABSTRACT

Tris(dialkylamino)sulfonium bifluoride salts are obtained by hydrolysis, methanolysis, or pyrolysis of corresponding tris(dialkylamino)sulfonium difluorotrimethylsilicates, reaction of dialkylaminotrialkylsilanes with sulfur tetrafluoride, or reaction of bis(dialkylamino)sulfur difluorides with dialkylamines. These bifluoride salts, which have the general formula $(R^1R^2N)(R^3R^4N)(R^5R^6N)S^\oplus HF_2^\ominus$, are useful polymerization catalysts.

14 Claims, No Drawings

TRIS(DIALKYLAMINO)SULFONIUM BIFLUORIDE CATALYSTS

BACKGROUND OF THE INVENTION

This invention relates to certain tris(dialkylamino)sulfonium compounds having utility as polymerization catalysts, and to processes for preparing these compounds.

Middleton, U.S. Pat. No. 3,940,402, discloses a class of tris(dialkylamino)sulfonium salts of the general formula

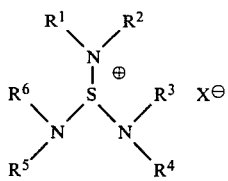

In the foregoing formula, the R groups are alkyl groups having 1 to 20 carbon atoms, each alkyl having at least two alpha hydrogen atoms, and X can be $(CH_3)_3SiF_2$, Cl, Br, I, CN, NCO, NCS, $NO_2$ or $N_3$. This patent also discloses a method for preparing difluorotrimethylsilicate salts of the formula $(R^1R^2N)(R^3R^4N)(R^5R^6N)S^+(CH_3)_3SiF_2^-$, by reacting sulfur tetrafluoride ($SF_4$) with at least 3 mole equivalents of a selected dialkylaminotrimethylsilane. The patent further discloses a method for preparing a sulfonium chloride salt in which X is Cl, by reacting the aforementioned difluorotrimethylsilicate salts with a suitable chlorine-releasing compound, e.g. α-chlorotoluene. Finally, the patent describes a process for preparing the remaining salts by reaction of the sulfonium chloride with appropriate reagents, e.g., sodium bromide, sodium cyanide, sodium thiocyanate, sodium nitrite, sodium azide or sodium cyanate.

Durrant et al., *Introduction to Advanced Inorganic Chemistry*, John Wiley & Sons, Inc., New York, pp 926–927 (1970) disclose processes for preparation of bifluorides of ammonium, alkylammonium, and alkali metal compounds by partial neutralization of a solution of hydrofluoric acid (HF) with a metal hydroxide or ammonium hydroxide. According to this reference, alkali metal fluorides absorb HF to form bifluorides, i.e. $KF + HF \rightarrow KHF_2$. In addition, Durrant et al. disclose that ammonium fluoride ($NH_4F$) can be converted to ammonium bifluoride by heating, i.e. $2NH_4F \rightarrow NH_4HF_2 + NH_3$.

However, House, et al., *Thermochimica Acta* 47:213–216 (1981) describe studies of thermal decomposition of ammonium fluoride, and conclude that "no evidence" could be found to support the existence of the reaction $2NH_4F \rightarrow NH_4HF_2 + NH_3$.

Fujiwara, et al., *J. Am. Chem. Soc.* 96:7625 (1974) disclose a process for thermally decomposing tetraethylammonium fluoride to provide tetraethylammonium bifluoride and other products. Deuterium-containing tetraethylammonium bifluoride was prepared by dissolving the bifluoride in deuterium-enriched water and evaporating excess water.

Delyagina et al., *Isvest. Akad. Nauk. SSSR, Ser. Khim.*, 10:2238 (1981), Eng. trans., disclose an ionic bifluoride $[(CH_3)_2N]_2CH^{\oplus}HF_2^{\ominus}$, prepared by reacting difluoromethylamine with dimethylamine in dimethylformamide.

Bifluoride salts, e.g., alkali metal bifluorides or ammonium bifluorides, are known to be useful catalysts in certain reactions, including certain polymerization reactions. Tuller, et al., U.S. Pat. No. 4,074,036, disclose a process for preparing polyanhydrides by copolymerization of a maleic monomer and selected alkyl-substituted styrenes in the presence of an alkali metal bifluoride catalyst.

SUMMARY OF THE INVENTION

In accordance with the present invention, there is provided a compound of the formula $$(R^1R^2N)(R^3R^4N)(R^5R^6N)S^{\oplus}HF_2^{\ominus}$$

wherein the R groups individually are alkyl groups of one to twenty carbon atoms, each having at least 2 alpha hydrogen atoms, or $R^1$ and $R^2$, $R^3$ and $R^4$, and $R^5$ and $R^6$, taken as individual pairs, can be $-(CH_2)_4-$ or $-(CH_2)_2CHY-(CH_2)_2-$, where Y is hydrogen or methyl. Preferred compounds of the invention are those in which the R groups are methyl or ethyl groups.

In addition, five processes are provided for preparing compounds of the foregoing formula.

DETAILED DESCRIPTION OF THE INVENTION

The invention provides five processes for preparing tris(dialkylamino)sulfonium bifluorides of the formula

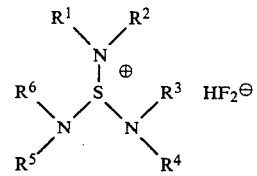

"Alkyl", in the context of the present invention, includes branched-chain and linear alkyl groups having at least 2 alpha hydrogens. Also included, when R groups are taken as individual pairs, are dialkylene radicals $-(CH_2)_4-$ and $-(CH_2)_2CHY-(CH_2)_2-$, where Y is H or $CH_3$. For cost considerations, preferred compounds of the invention are those in which the R groups are methyl or ethyl.

Examples of compounds of the invention include tris(dimethylamino)sulfonium bifluoride, tris(diethylamino)sulfonium bifluoride, tris(methylethylamino)sulfonium bifluoride, tris(n-propylamino)sulfonium bifluoride, tris(di-n-propylamino)sulfonium bifluoride, bis(di-n-propylamino)(dimethylamino)sulfonium bifluoride, bis(dimethylamino)(N-octadecyl-N-methylamino)sulfonium bifluoride, tris(piperidino)sulfonium bifluoride, tris(pyrrolidino)sulfonium bifluoride, bis(dimethylamino)pyrrolidinosulfonium bifluoride, bis(pyrrolidino)(dimethylamino)sulfonium bifluoride, tris(N-methyl-N-octadecylamino)sulfonium bifluoride, tris(4-methylpiperidino)sulfonium bifluoride, and bis(dimethylamino)(diethylamino)sulfonium bifluoride.

Tris(dialkylamino)sulfonium difluoromethylsilicates, which are used as starting materials in the processes numbered 1 through 3, below, can be prepared according to the processes disclosed by Middleton, U.S. Pat. No. 3,940,402.

1. Hydrolysis of tris(dialkylamino)sulfonium difluorotrimethylsilicate

According to a preferred process for preparing the bifluorides of the invention, a tris(dialkylamino)sulfonium difluorotrimethylsilicate of the formula

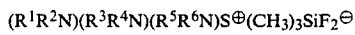

$(R^1R^2N)(R^3R^4N)(R^5R^6N)S^{\oplus}(CH_3)_3SiF_2^{\ominus}$ is dissolved in a suitable solvent, and reacted with water in a molar ratio of water to silicate of at least 0.5, at a temperature from about 10° C. to about 80° C., preferably from about 20° C. to about 40° C. Larger amounts of water do not adversely affect the reaction but increase the energy required to dry the product. Suitable solvents include acetonitrile, benzonitrile, tetrahydrofuran, dimethylethylene glycol, diethyl ether, and certain hydrocarbons, for example, pentane, hexane, toluene and xylenes. Of the foregoing, acetonitrile is the most convenient and thus is preferred. Reaction pressure is not critical; however, atmospheric pressure is preferred. Optionally, the product can be recrystallized from tetrahydrofuran.

Bifluorides of the invention wherein some or all of the hydrogen present in the $HF_2^-$ anion is replaced by deuterium can be prepared by use of deuterium-enriched water in the foregoing process. These compounds are useful analytical reagents.

2. Methanolysis of tris(dialkylamino)sulfonium difluorotrimethylsilicate

A second process for preparing the bifluorides of the invention comprises dissolving a tris(dialkylamino)sulfonium difluorotrimethylsilicate of the formula

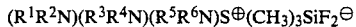

$(R^1R^2N)(R^3R^4N)(R^5R^6N)S^{\oplus}(CH_3)_3SiF_2^{\ominus}$ in a molar excess of methanol. The resulting solution is refluxed by heating the solution to a temperature of about 64°–70° C. in a distilling vessel, condensing the resulting distillate, and returning the condensed distillate to the vessel. This step can be conducted for a period from about 5 minutes to about 5 hours, preferably from about 20 to about 60 minutes. At the conclusion of the refluxing step, the bifluorides of the invention can be recovered by evaporating the refluxed solution to dryness and collecting the resulting residue.

3. Pyrolysis of tris(dialkylamino)sulfonium difluorotrimethylsilicate

In accordance with a third process for preparing bifluorides of the invention, a tris(dialkylamino)sulfonium difluorotrimethylsilicate of the formula

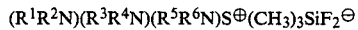

$(R^1R^2N)(R^3R^4N)(R^5R^6N)S^{\oplus}(CH_3)_3SiF_2^{\ominus}$ is pyrolyzed by heating to a temperature between about 60° C. to about 200° C., at atmospheric or subatmospheric pressure. Preferably, pyrolysis is conducted at a temperature between about 85° and about 120° C., and at reduced pressure, preferably from about 0.013 to about 2.7 kPa. The resulting solid residue contains bifluorides of the invention.

4. Reaction of a Dialkylaminotrialkylsilane with $SF_4$

A fourth process for preparing the bifluoride salts of the invention comprises forming a selected dialkylaminotrialkylsilane by reacting a chlorotrialkylsilane wherein each alkyl group contains from 2 to 6 carbon atoms with a dialkylamine in a suitable inert solvent, for example, diethyl ether, methylene chloride, chloroform, fluorotrichloromethane, tetrahydrofuran or dioxane. The resulting dialkylaminotrialkylsilane is added in a molar ratio of about 2.5:1 to about 6:1, preferably about 3:1, to a solution of sulfur tetrafluoride in a suitable solvent cooled to a temperature of from about −100° C. to about 0° C. The resulting reaction mixture is agitated by stirring or other means, at a temperature of about 0° C. to about 50° C., for a period of about 3 hours to about 2 weeks. Preferably, the reaction is conducted for a period of about 6 hours to about 48 hours.

Alternatively, compounds of the invention in which the dialkyl substituents $R^1$ through $R^6$ are different can be produced by reacting dialkylaminotrialkylsilanes $(R^1R^2N)SiR_3$, $(R^3R^4N)SiR_3$ and $(R^5R^6N)SiR_3$ with $SF_4$ in a molar ratio of dialkylaminotrialkylsilanes to $SF_4$ of about 2.5 to about 6, preferably about 3.

Suitable solvents for this reaction include acetonitrile, benzonitrile, tetrahydrofuran, dimethylethylene glycol, ethers such as diethyl ether, and hydrocarbons such as pentane, hexane, toluene and xylene. Of the above, diethyl ether is the most convenient and is therefore preferred. Suitable dialkylaminotrialkylsilanes for this process are compounds of the formula $(R')_2NSiR_3$, wherein R is $C_{2-6}$ alkyl, and $R'$ is $R^1$–$R^6$ as previously defined. Preferred starting materials for this process are dialkylaminotriethylsilanes.

5. Reaction of a Bis(dialkylamino)sulfur Difluoride with a Dialkylamine

A fifth process for preparing the bifluoride salts of the invention comprises reacting a bis(dialkylamino)sulfur difluoride of the formula $(R^1R^2N)(R^3R^4N)SF_2$ with an approximately equimolar amount of a selected dialkylamine $R^5R^6NH$ in a suitable solvent. Suitable solvents include acetonitrile, benzonitrile, tetrahydrofuran, dimethylethylene glycol, diethyl ether, and certain hydrocarbons, for example, pentane, hexane, toluene and xylenes. Of these, diethyl ether is convenient and inexpensive and therefore preferred. In the foregoing formulas, $R^1$–$R^6$ are as previously defined.

According to this process, the selected dialkylamine is added slowly to a stirred solution of the bis(dialkylamino)sulfur difluoride at a temperature of about −30° C. to about 10° C., and the resulting mixture warmed to a temperature between about 10° C. and about 50° C. Stirring is continued at this temperature for a period of at least about 6 hours, preferably about 15 to about 24 hours. The resulting precipitated product, which can be recovered by filtration, is a bifluoride salt of the invention.

The following examples are provided to further illustrate the compounds and processes of the invention. In the examples, all percentages are by weight and all temperatures are in degrees Celsius unless otherwise indicated.

EXAMPLE 1

Preparation of Tris(dimethylamino)sulfonium Bifluoride by Hydrolysis of Tris(dimethylamino)Sulfonium Difluorotrimethylsilicate

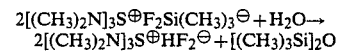

$2[(CH_3)_2N]_3S^{\oplus}F_2Si(CH_3)_3^{\ominus} + H_2O \rightarrow$
$2[(CH_3)_2N]_3S^{\oplus}HF_2^{\ominus} + [(CH_3)_3Si]_2O$ 11.22 g (40.7 mmol) of tris(dimethylamino)sulfonium difluorotrimethylsilicate were dissolved in 10 ml of distilled acetonitrile under argon at ambient temperature. 0.6 ml (33 mmol) of water was added, whereupon rapid formation of an oily material was observed. The acetonitrile was evaporated and the resulting solid product stirred overnight in about 100 ml of tetrahydrofuran. The resulting crystalline product was recovered by filtration under argon and dried at about 25° and about 0.1 mm Hg pressure for 3 days. The product weighed 8.20 g, representing a 99.7% recovery, and exhibited a melting point of 143.5° to 145°. $^{19}F$ NMR and elemental analysis confirmed the structure to be $[(CH_3)_2N]_3SHF_2$. $^{19}F$ NMR ($CD_3CN$, 0° C.): $\delta-145.8$ (doublet, $J_{HF}=120$ Hz).

Anal. Calcd. for $C_6H_{19}F_2N_3S$: C: 35.47, H: 9.42, F: 18.68, N: 20.66, S: 15.77, Found: C: 35.45, H: 9.36, F: 17.52, N: 20.99, S: 16.15.

The foregoing reaction was substantially repeated using 27.5 g (100 mmol) of tris(dimethylamino)sulfonium difluorotrimethylsilicate and 1.0 ml (55 mmol) of water. The resulting solid product (mp=147°-148°) obtained following evaporation of acetonitrile was not treated with tetrahydrofuran. Tris(dimethylamino)sulfonium bifluoride was obtained in quantitative yield and structure was confirmed by $^{19}F$ NMR and elemental analysis.

EXAMPLE 2

Preparation of Tris(dimethylamino)sulfonium Bifluoride by Methanolysis of Tris(dimethylamino)-sulfonium Difluorotrimethylsilicate $$[(CH_3)_2N]_3S^{\oplus}(CH_3)_3SiF_2^{\ominus} + CH_3OH \rightarrow$$
$$[(CH_3)_2N]_3S^{\oplus}HF_2^{\ominus} + (CH_3)_3SiOCH_3$$

A solution of 16.52 g (59.9 mmol) of tris(dimethylamino)sulfonium difluorotrimethylsilicate in 100 ml methanol was refluxed 30 min and then evaporated to dryness under reduced pressure, leaving a residual syrup. Large crystals slowly formed in the residual syrup, which were collected on a filter and washed with diethyl ether. 1.88 g (15.4%) of bifluoride was obtained in the form of large, transparent crystals: mp 110°-116°; $^{19}F$ NMR ($CD_3CN$) $\delta-148.4$ ppm.

Anal. Calcd for $C_6H_{19}N_3SF_2$: F, 18.69; Found: F, 17.99.

EXAMPLE 3

Preparation of Tris(dimethylamino)sulfonium Bifluoride by Pyrolysis of Tris(dimethylamino)sulfonium Difluorotrimethylsilicate

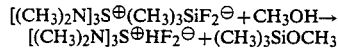

$$[(CH_3)_2N]_3S^{\oplus}HF_2^{\ominus} + (CH_3)_3SiF$$

A 25 g (91 mmol) sample of tris(dimethylamino)sulfonium difluorotrimethylsilicate was heated in a flask to about 96°. The flask containing the resulting melted sample was evacuated to 1 mm Hg, and distilled volatiles were collected in a trap cooled with dry ice. The melted sample solidified while being maintained at about 96°. After one hour at about 96°, the flask containing solidified material was cooled, and the cooled, solidified material chipped out to provide 9.47 g of a white, hygroscopic powder, mp 139°-141°, $^1H$ NMR ($CD_3CN$) $\delta 2.91$ ppm, $^{19}F$ NMR ($CD_3CN$) $\delta-147.5$ ppm.

Anal. Calcd for $C_6H_{19}N_3SF_2$: C: 35.45; H: 9.42; N: 20.67; F: 18.69; S: 15.75. Found: C: 35.48; H: 9.50; N: 22.22; F: 19.14; S: 15.03.

EXAMPLE 4

Preparation of Tris(dimethylamino)sulfonium Bifluoride from Sulfur Tetrafluoride and Dimethylaminotriethylsilane

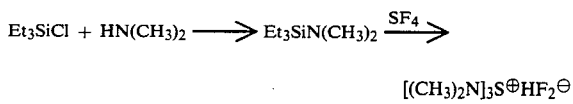

$$[(CH_3)_2N]_3S^{\oplus}HF_2^{\ominus}$$

Triethylchlorosilane, 75.4 g (0.5 mole), was added dropwise to a solution of 73 ml (1.1 mole) of dimethylamine in 500 ml diethyl ether at 10°-20°. A precipitate was removed by filtration, and the resulting filtrate distilled to provide 64.8 g of dimethylaminotriethylsilane as a colorless liquid, bp 88° (46 mm). A 47.8 g (0.3 mole) sample of the silane was added dropwise to a solution of 5 ml (0.09 mole) of sulfur tetrafluoride in 100 ml of ether cooled to $-70°$. The resulting mixture was allowed to warm to about 23° and stirred for one week. The resulting white solid precipitate was collected on a filter, washed with ether, and dried under nitrogen to give 6.8 g of tris(dimethylamino)sulfonium bifluoride as colorless crystals: mp 117°-120°; $^{19}F$ NMR ($CD_3CN$) $\delta-150.4$ ppm; $^1H$ NMR ($CD_3CN$) $\delta+2.95$ ppm.

Anal. Calcd for $C_6H_{19}N_3SF_2$: C: 35.45; H: 9.42; F: 18.69; Found: C: 38.38; H: 9.68; F: 18.40.

EXAMPLE 5

Bis(dimethylamino) (N-octadecyl-N-methylamino)-sulfonium Bifluoride

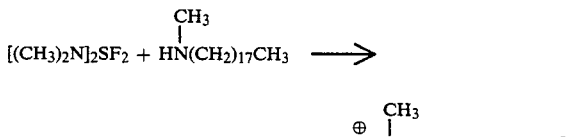

A solution of 28.4 g (0.1 mole) of N-methyl-N-octadecylamine in 150 ml of diethyl ether was added dropwise to a stirred solution of 15.8 g (0.1 mole) of bis(dimethylamino)sulfur difluoride in 100 ml diethyl ether cooled to about 4°. The resulting mixture was warmed to about 23° and stirred for about 20 h. A white solid precipitate formed and was collected on a filter and washed with additional diethyl ether. 37.91 g of bifluoride were obtained as white, waxy crystals: mp 66°; $^{19}F$ NMR ($CD_3CN$) $\delta-153.1$ ppm (very broad, $HF_2^-$); $^1H$ NMR ($CD_3CN$) $\delta 1.28$ ppm (s, 34H); 0.90 ppm (m, 3H); 2.87 ppm (s, 15H);

Anal. Calcd for $C_{23}H_{53}F_2N_3S$: F, 8.60; Found: F, 8.86.

EXAMPLE 6

Polymerization of Methyl Methacrylate Initiated by [(1-Methoxy-2-methyl-1-propenyl)oxy]-trimethylsilane (MTS) and Catalyzed by Tris(dimethylamino)sulfonium Bifluoride 20 mg (0.1 mmol) of tris(dimethylamino) sulfonium bifluoride, prepared according to a process substantially similar to that set forth in Example 1, above, were suspended in 30 ml tetrahydrofuran. 2.0 ml (10 mmol) [1-methoxy-2-methyl-1-propenyl)oxy]-trimethylsilane (MTS) were added to the resulting suspension, under an argon atmosphere. At this point, 10.6 ml (98 mmol) of methyl methacrylate was added slowly, with stirring, over a period of about 20 minutes. During this period, the temperature of the resulting mixture was observed to rise from an initial temperature of about 21° to a peak temperature of about 46.2°. Stirring was continued until the temperature of the mixture returned to about 21°, and 5 ml methanol were added to the mixture to quench the resulting living polymer. 11.3 g of polymer were recovered following evaporation of volatiles.

Molecular weight by gel permeation chromatographic analysis: $M_n$ 805; $M_w$ 969; polydispersity 1.20.

BEST MODE

The best mode presently contemplated for carrying out the invention is demonstrated by Example 1.

UTILITY

The tris(dialkylamino)sulfonium bifluorides of the invention have utility as polymerization catalysts. In particular, the compounds of the invention are useful catalysts in polymerization and copolymerization reactions of selected α,β-unsaturated compounds, for example, acrylate and methacrylate monomers, in the presence of certain initiators containing silicon, tin or germanium.

I claim:

1. A compound of the formula $$(R^1R^2N)(R^3R^4N)(R^5R^6N)S^+HF_2^-$$

wherein the R groups individually are alkyl groups of one to twenty carbon atoms, each alkyl group having at least 2 alpha-hydrogen atoms, or $R^1$ and $R^2$, $R^3$ and $R^4$, and $R^5$ and $R^6$, taken as individual pairs, can be $-(CH_2)_4-$ or $-(CH_2)_2CHY(CH_2)_2-$, where Y is hydrogen or methyl.

2. A compound according to claim 1 wherein each R group is either methyl or ethyl.

3. A compound according to claim 2 wherein all the R groups are methyl.

4. A compound according to claim 2 wherein all the R groups are ethyl.

5. A process for preparing a compound of claim 1, comprising contacting a silicate of formula  $(R^1R^2N)(R^3R^4N)(R^5R^6N)S^+(CH_3)_3SiF_2^-$ with water, in a molar ratio of water to silicate of at least 0.5, at a temperature from about 10° C. to about 80° C., in the presence of a suitable solvent, where $R^1$ through $R^6$ are defined as in claim 1.

6. A process according to claim 5 wherein the solvent is selected from the group consisting of acetonitrile, benzonitrile, tetrahydrofuran, diethylether, pentane, hexane, toluene and xylenes.

7. A process according to claim 6 wherein the solvent is acetonitrile, and the temperature is from about 20° C. to about 40° C.

8. A process according to claim 5 wherein the water is enriched with deuterium.

9. A process for preparing a compound of claim 1, comprising contacting a silicate of formula $(R^1R^2N)(R^3R^4N)(R^5R^6N)S^+(CH_3)_3SiF_2^-$ with a molar excess of methanol at a temperature of about 64°–70° C. for a period from about 5 minutes to about 5 hours, where $R^1$ through $R^6$ are defined as in claim 1.

10. A process for preparing a compound of claim 1 comprising heating a compound of formula $(R^1R^2N)(R^3R^4N)(R^5R^6N)S^+(CH_3)_3SiF_2^-$ to a temperature from about 60° C. to about 200° C., where $R^1$ through $R^6$ are defined as in claim 1.

11. A process of claim 10 wherein heating is conducted at a pressure of from about 0.013 kPa to about 2.7 kPa and at a temperature from about 85° C. to about 120° C.

12. A process for preparing a compound of claim 1 comprising contacting one or more dialkylaminotrialkylsilanes selected from the group consisting of the compounds $(R^1R^2N)SiR_3$, $(R^3R^4N)SiR_3$, and $(R^5R^6N)SiR_3$, wherein R is an alkyl group of from 2 to 6 carbon atoms, with $SF_4$ in a molar ratio of dialkylaminotrialkylsilanes to $SF_4$ of about 2.5 to about 6, in a suitable solvent and at a temperature from about $-100°$ C. to about 0° C., and agitating the resulting mixture at a temperature from about 0° C. to about 50° C. for about 3 hours to about 2 weeks, where $R^1$ through $R^6$ are defined as in claim 1.

13. A process of claim 12 wherein the solvent is diethyl ether, R is ethyl, and the molar ratio of dialkylaminotrialkylsilanes to $SF_4$ is about 3.

14. A process for preparing a compound of claim 1 comprising contacting approximately equimolar amounts of a compound of formula $(R^1R^2N)(R^3R^4N)SF_2$ with a compound of formula $R^5R^6NH$ in a suitable solvent, at a temperature from about $-30°$ C. to about 10° C., and stirring the resulting mixture at a temperature of from about 10° C. to about 50° C. for a period of at least 6 hours, where $R^1$ through $R^6$ are defined as in claim 1.

* * * * *